United States Patent
Jiang et al.

(10) Patent No.: US 11,438,924 B2
(45) Date of Patent: Sep. 6, 2022

(54) MESSAGE SENDING METHODS AND APPARATUSES, AND RESOURCE ALLOCATING METHODS AND APPARATUSES

(71) Applicant: Beijing Xiaomi Mobile Software Co., Ltd., Beijing (CN)

(72) Inventors: Xiaowei Jiang, Beijing (CN); Ming Zhang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 38 days.

(21) Appl. No.: 17/056,197

(22) PCT Filed: May 18, 2018

(86) PCT No.: PCT/CN2018/087561
§ 371 (c)(1),
(2) Date: Nov. 17, 2020

(87) PCT Pub. No.: WO2019/218365
PCT Pub. Date: Nov. 21, 2019

(65) Prior Publication Data
US 2021/0219334 A1 Jul. 15, 2021

(51) Int. Cl.
| H04W 74/00 | (2009.01) |
| H04W 74/08 | (2009.01) |
| H04W 80/02 | (2009.01) |
| H04W 72/04 | (2009.01) |

(52) U.S. Cl.
CPC ..... H04W 74/004 (2013.01); H04W 74/0833 (2013.01); H04W 80/02 (2013.01)

(58) Field of Classification Search
CPC ........... H04W 74/004; H04W 74/0833; H04W 80/02; H04W 72/0413; H04W 72/044; H04W 72/0493; H04W 74/002
See application file for complete search history.

(56) References Cited

U.S. PATENT DOCUMENTS

| 2015/0072647 A1 | 3/2015 | Rogers |
| 2017/0195464 A1 | 7/2017 | Lee et al. |

(Continued)

FOREIGN PATENT DOCUMENTS

| CN | 103209459 A | 7/2013 |
| CN | 106255223 A | 12/2016 |

(Continued)

OTHER PUBLICATIONS

ISA State Intellectual Property Office of the People's Republic of China, International Search Report Issued in Application No. PCT/CN2018/087561, dated Dec. 7, 2018, 4 pages.

(Continued)

*Primary Examiner* — Harry H Kim
(74) *Attorney, Agent, or Firm* — Finnegan, Henderson, Farabow, Garrett & Dunner, L.L.P.

(57) ABSTRACT

A message sending method includes: sending a first message of random access to a base station; receiving a second message of random access from the base station; and sending a third message of random access via uplink resources indicated by the second message of random access. According to the examples of the present disclosure, the first indication information is carried in MSG1 to indicate a data amount of an uplink CCCH SDU included in MSG3 to be sent by the user equipment, such that the base station determines the data amount of the uplink CCCH SDU according to the first indication information, and then a data amount allowable to be transmitted via the uplink resources indicated by resulting MSG2 from the base station is greater than or equal to the data amount of the uplink CCCH SDU.

18 Claims, 10 Drawing Sheets

(56) References Cited

U.S. PATENT DOCUMENTS

| | | | |
|---|---|---|---|
| 2017/0231012 A1* | 8/2017 | Sung | H04L 25/00 |
| 2017/0318606 A1 | 11/2017 | Lee et al. | |
| 2018/0206290 A1* | 7/2018 | Dai | H04W 52/50 |
| 2018/0302929 A1* | 10/2018 | Takahashi | H04W 74/006 |
| 2019/0124715 A1* | 4/2019 | Chen | H04W 76/27 |
| 2020/0187245 A1* | 6/2020 | Fujishiro | H04W 74/002 |
| 2021/0360730 A1* | 11/2021 | Kim | H04W 76/28 |
| 2022/0007423 A1* | 1/2022 | Agiwal | H04W 76/27 |
| 2022/0039068 A1* | 2/2022 | Hoglund | H04W 74/008 |

FOREIGN PATENT DOCUMENTS

| | | |
|---|---|---|
| CN | 106797660 A | 5/2017 |
| CN | 107046728 A | 8/2017 |
| CN | 107454620 A | 12/2017 |
| JP | 2017163519 A | 9/2017 |
| WO | WO 2016/171767 A1 | 10/2016 |
| WO | WO 2018/086600 A1 | 5/2018 |

OTHER PUBLICATIONS

NTT Docomo, Inc., "Clarification on RA preamble groups for MTCe", 3GPP TSG-RAN WG2 Meeting #95, Gothenburg, Sweden, R2-165930, Aug. 22-26, 2016, 5 pages.

European Patent Office, Extended European Search Report Issued in Application No. 18918719.8, dated Apr. 29, 2021, 13 pages.

ISA State Intellectual Property Office of the People's Republic of China, Written Opinion of the International Searching Authority Issued in Application No. PCT/CN2018/087561, dated Dec. 7, 2018, 11 pages.

NTT Docomo, Inc., "Functional extension for U-plane C-IoT optimisation", 3GPP TSG-RAN WG2 Meeting #94, Nanjing, China, R2-164576, May 23-27, 2016, 7 pages.

Nokia, NTT Docomo, Nokia Shanghai Bell, "Clarification on the Preamble group B selection", 3GPP TSG-RAN WG2 Meeting #102, Busan, South Korea, R2-1808030, Revision of R2-1800965, May 21-25, 2018, 2 pages.

ASUSTeK, "Issue of insufficient uplink grant in RAR", 3GPP TSG-RAN WG2 Meeting #102, Busan, Korea, R2-1806921, May 21-25, 2018, 4 pages.

NTT Docomo, Inc.,"RA preamble partitioning for multiple CCCH SDU sizes", 3GPP TSG-RAN WG2 #94, Nanjing, China, R2-163368, May 23-27, 2016, 7 pages.

Office Action dated Feb. 7, 2022, from the State Intellectual Property Office of the People's Republic of China, issued in counterpart Chinese Application No. 201880000686.0.

Office Action dated Dec. 22, 2021, from the Intellectual Property India issued in counterpart Indian Application No. 202047053795.

* cited by examiner

MESSAGE SENDING METHODS AND APPARATUSES, AND RESOURCE ALLOCATING METHODS AND APPARATUSES

CROSS REFERENCE TO RELATED APPLICATIONS

This application is a national phase application based on International Application No. PCT/CN2018/087561, filed May 18, 2018, the content of which is incorporated herein by reference.

TECHNICAL FIELD

The present application relates to the technical field of communication, and in particular, to message sending methods, message sending apparatuses, resource allocating methods, resource allocating apparatuses, electronic devices and computer readable storage media.

BACKGROUND

In a process of random access, user equipment may carry data in an uplink CCCH SDU (common control channel service data unit) through MSG3 (the third message of random access). The uplink CCCH SDU may carry contents of an RRC (radio resource control) message, such as a connection establishment request, a connection resume request, a connection reestablishment request, or the like. Uplink resources required for the user equipment sending MSG3 may be determined according to MSG2 (the second message of random access) from a base station. MSG2 carries UL grant to indicate uplink resources allocated for the user equipment to send MSG3.

Since an RLC (radio link control) entity corresponding to MSG3 is in a TM (transparent mode), segmentation will not be performed for MSG3. If uplink resources allocated for the user equipment to send MSG3 is less than the uplink resources required for the user equipment to send MSG3, where the uplink resources allocated for the user equipment to send MSG is indicated in the UL grant in MSG2, the user equipment needs to send a buffer status report to the base station, such that the base station allocates uplink resources suitable for the user equipment to send MSG3. In this way the user equipment can send MSG3 to the base station, which results in additional power consumption and latency.

To avoid this situation, it is necessary to ensure that the base station allocates the uplink resources suitable for the user equipment to send MSG3. However, according to different data amounts included in MSG3, the required uplink resources are different. For example, the data amount of MSG3 may be 56 bits (including 48 bits uplink CCCH SDU and 8 bits MAC header), or 88 bits (including 80 bits uplink CCCH SDU and 8 bits MAC header), where MAC refers to Media Access Control. Since the base station does not know the data amount of MSG3, the base station is to allocate uplink resources greater than 88 bits for the user equipment, which, however, causes a waste of the uplink resources in a case where the data amount of MSG3 sent by the user equipment is 56 bits.

SUMMARY

In view of this, examples of the present disclosure provide message sending methods, message sending apparatuses, resource allocating methods, resource allocating apparatuses, electronic devices and computer readable storage media.

According to a first aspect of examples of the present disclosure, there is provided a message sending method. The method is applicable to user equipment, and includes:

sending a first message of random access to a base station, where the first message of random access includes first indication information, and the first indication information indicates a data amount of an uplink common control channel service data unit (CCCH SDU) included in a third message of random access to be sent;

receiving a second message of random access from the base station; and sending the third message of random access via uplink resources indicated by the second message of random access, where a data amount allowable to be transmitted via the uplink resources is greater than or equal to the data amount of the uplink CCCH SDU.

Optionally, the first indication information is information on time/frequency resources used by the user equipment to send the first message of random access.

Optionally, the first indication information is an index of a preamble included in the first message of random access.

Optionally, the first indication information is information on a preamble group to which a preamble included in the first message of random access belongs.

Optionally, the first indication information is a payload carried by a preamble included in the first message of random access.

Optionally, the first indication information is information on a scrambling code associated with a preamble included in the first message of random access.

Optionally, the first indication information indicates a type of the data amount of the uplink CCCH SDU included in the third message of random access; or the first indication information indicates a data amount of the uplink CCCH SDU and a media access control (MAC) header included in the third message of random access.

Optionally, the first message of random access further includes second indication information, and the second indication information indicates whether the third message of random access includes the uplink CCCH SDU.

Optionally, the message sending method further includes:

before sending the first message of random access to the base station, determining data amount ranges according to a plurality of preset data amounts;

determining whether a data amount of the third message of random access is equal to any one of the plurality of preset data amounts;

if the data amount of the third message of random access is not equal to any one of the plurality of preset data amounts, determining a data amount range in which the data amount of the third message of random access is located; and taking an upper limit value of the data amount range as the data amount of the third message of random access.

According to a second aspect of the examples of the present disclosure, there is provided a resource allocating method. The method is applicable to a base station, and includes:

receiving a first message of random access from user equipment, where the first message of random access includes first indication information;

determining, according to the first indication information, a data amount of an uplink CCCH SDU included in a third message of random access to be sent by the user equipment;

generating a second message of random access according to the determined data amount, where the second message of random access indicates uplink resources for transmitting the included uplink CCCH SDU by the user equipment, and a data amount allowable to be transmitted via the uplink resources is greater than or equal to the data amount of the included uplink CCCH SDU; and sending the second message of random access to the user equipment.

Optionally, determining, according to the first indication information, a data amount of the third message of random access to be sent by the user equipment includes:

determining, according to information on time/frequency resources where the first message of random access is located, the data amount of the third message of random access to be sent by the user equipment.

Optionally, determining, according to the first indication information, a data amount of the third message of random access to be sent by the user equipment includes:

determining, according to an index of a preamble included in the first message of random access, the data amount of the third message of random access to be sent by the user equipment.

Optionally, determining, according to the first indication information, a data amount of the third message of random access to be sent by the user equipment includes:

determining, according to information on a preamble group to which a preamble included in the first message of random access belongs, the data amount of the third message of random access to be sent by the user equipment.

Optionally, determining, according to the first indication information, a data amount of the third message of random access to be sent by the user equipment includes:

determining, according to a payload carried by a preamble included in the first message of random access, the data amount of the third message of random access to be sent by the user equipment.

Optionally, determining, according to the first indication information, a data amount of the third message of random access to be sent by the user equipment includes:

determining, according to information on a scrambling code associated with a preamble included in the first message of random access, the data amount of the third message of random access to be sent by the user equipment.

Optionally, determining, according to the first indication information, a data amount of the third message of random access to be sent by the user equipment includes:

determining, according to the first indication information, a type of the data amount of the uplink CCCH SDU included in the third message of random access; or determining, according to the first indication information, a data amount of the uplink CCCH SDU and a MAC header included in the third message of random access.

Optionally, the first message of random access includes second indication information, and the method further includes:

determining, according to the second indication information, whether the third message of random access includes the uplink CCCH SDU.

According to a third aspect of the examples of the present disclosure, there is provided a message sending apparatus. The apparatus is applicable to user equipment, and includes:

a first sending module configured to send a first message of random access to a base station, where the first message of random access includes first indication information, and the first indication information indicates a data amount of an uplink CCCH SDU included in a third message of random access to be sent;

a first receiving module configured to receive a second message of random access from the base station; and a second sending module configured to send the third message of random access via uplink resources indicated by the second message of random access, where a data amount allowable to be transmitted via the uplink resources is greater than or equal to the data amount of the uplink CCCH SDU.

Optionally, the first indication information is information on time/frequency resources used by the user equipment to send the first message of random access.

Optionally, the first indication information is an index of a preamble included in the first message of random access.

Optionally, the first indication information is information on a preamble group to which a preamble included in the first message of random access belongs.

Optionally, the first indication information is a payload carried by a preamble included in the first message of random access.

Optionally, the first indication information is information on a scrambling code associated with a preamble included in the first message of random access.

Optionally, the first indication information indicates a type of the data amount of the uplink CCCH SDU included in the third message of random access; or the first indication information indicates a data amount of the uplink CCCH SDU and a MAC header included in the third message of random access.

Optionally, the first message of random access further includes second indication information, and the second indication information indicates whether the third message of random access includes the uplink CCCH SDU.

Optionally, the message sending apparatus further includes:

a range generating module configured to, before sending the first message of random access to the base station, determine data amount ranges according to a plurality of preset data amounts;

an equality determining module configured to determine whether a data amount of the third message of random access is equal to any one of the plurality of preset data amounts;

a range determining module configured to, if the data amount of the third message of random access is not equal to any one of the plurality of preset data amounts, determine a data amount range in which the data amount of the third message of random access is located; and a data amount replacing module configured to take an upper limit value of the data amount range as the data amount of the third message of random access.

According to a fourth aspect of the examples of the present disclosure, there is provided a resource allocating apparatus. The apparatus is applicable to a base station, and includes:

a second receiving module configured to receive a first message of random access from user equipment, where the first message of random access includes first indication information;

a data amount determining module configured to determine, according to the first indication information, a data amount of an uplink CCCH SDU included in a third message of random access to be sent by the user equipment;

a message generating module configured to generate a second message of random access according to the data amount, where the second message of random access indicates uplink resources for transmitting the included uplink CCCH SDU by the user equipment, and a data amount allowable to be transmitted via the uplink resources is greater than or equal to the data amount of the included uplink CCCH SDU; and a third sending module configured to send the second message of random access to the user equipment.

Optionally, the data amount determining module is configured to determine, according to information on time/frequency resources where the first message of random access is located, a data amount of the third message of random access to be sent by the user equipment.

Optionally, the data amount determining module is configured to determine, according to an index of a preamble included in the first message of random access, a data amount of the third message of random access to be sent by the user equipment.

Optionally, the data amount determining module is configured to determine, according to information on a preamble group to which a preamble included in the first message of random access belongs, a data amount of the third message of random access to be sent by the user equipment.

Optionally, the data amount determining module is configured to determine, according to a payload carried by a preamble included in the first message of random access, a data amount of the third message of random access to be sent by the user equipment.

Optionally, the data amount determining module is configured to determine, according to information on a scrambling code associated with a preamble included in the first message of random access, a data amount of the third message of random access to be sent by the user equipment.

Optionally, the data amount determining module is configured to determine, according to the first indication information, a type of the data amount of the uplink CCCH SDU included in the third message of random access; or determine, according to the first indication information, a data amount of the uplink CCCH SDU and a MAC header included in the third message of random access.

Optionally, the first message of random access includes second indication information, and the resource allocating apparatus further includes:

a comprisal determining module configured to determine, according to the second indication information, whether the third message of random access includes the uplink CCCH SDU.

According to a fifth aspect of the examples of the present disclosure, there is provided an electronic device, and the electronic device includes:

a processor; and a memory for storing instructions executable by the processor, where the processor is configured to execute the message sending method according to any one of the examples as described above.

According to a sixth aspect of the examples of the present disclosure, there is provided an electronic device, and the electronic device includes:

a processor; and a memory for storing instructions executable by the processor, where the processor is configured to execute a resource allocating method according to any one of the examples as described above.

According to a seventh aspect of the examples of the present disclosure, there is provided a computer readable storage medium storing a computer program, where the program is executed by a processor to perform the message sending method according to any one of the examples as described above.

According to an eighth aspect of the examples of the present disclosure, there is provided a computer readable storage medium storing a computer program, where the program is executed by a processor to perform the resource allocating method according to any one of the examples as described above.

As can be known from the above description, according to the examples of the present disclosure, the first indication information is carried in MSG1 to indicate the data amount of the uplink CCCH SDU included in MSG3, where MSG3 is to be sent by the user equipment, such that the base station may determine the data amount of the uplink CCCH SDU according to the first indication information, which in turn makes the data amount allowable to be transmitted via the uplink resources greater than or equal to the data amount of the uplink CCCH SDU, where the uplink resources is indicated by MSG2 and generated by the base station. Therefore, it is ensured that the user equipment may complete the sending of MSG3 in one sending operation according to the uplink resources indicated by MSG2. There is no need for the base station to allocate excessive uplink resources, thereby avoiding a waste of the uplink resources.

BRIEF DESCRIPTION OF THE DRAWINGS

To describe the technical solutions in examples of the present disclosure more clearly, drawings required in descriptions of the examples will be briefly introduced below. It is apparent that the drawings described below are merely some examples of the present disclosure and for those of ordinary skill in the art, other drawings can be obtained based on these drawings without creative efforts.

DETAILED DESCRIPTION OF THE EMBODIMENTS

The technical solutions in examples of the present disclosure will be described clearly and completely with reference to the drawings thereof. Apparently, the described examples are merely a part of the examples of the present disclosure, rather than all of the examples. Based on the examples of the present disclosure, all other examples obtained by those of ordinary skill in the art without creative work shall fall within the protection scope of the present disclosure.

Figure 1:
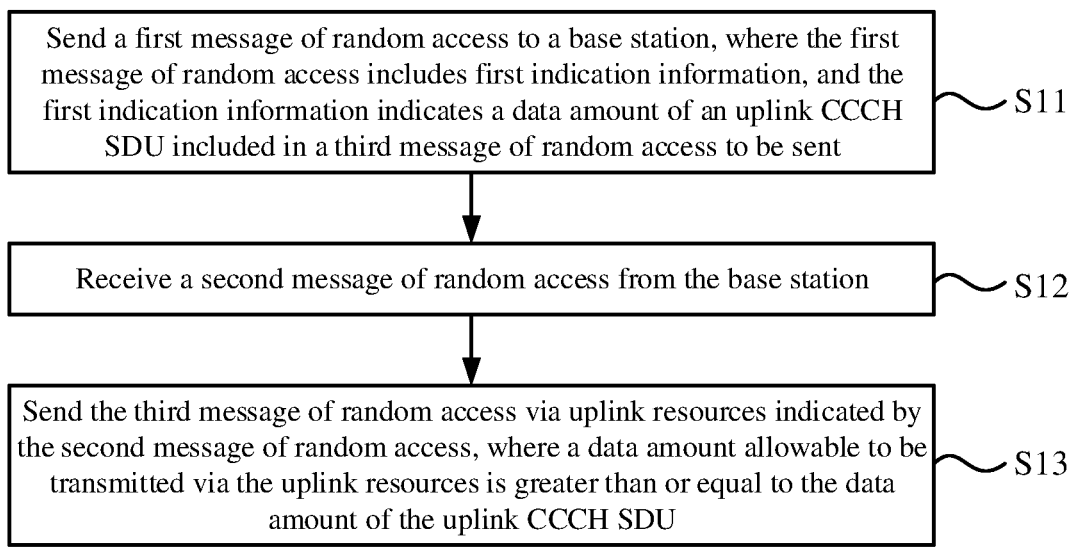
FIG. 1 is a schematic flowchart illustrating a message sending method according to an example of the present disclosure.

FIG. 1 is a schematic flowchart illustrating a message sending method according to an example of the present disclosure. The message sending method in the example may be applicable to user equipment, such as a mobile phone, a tablet computer, and so on. The user equipment can communicate with a base station.

As shown in FIG. 1, the message sending method includes the following steps.

At step S11, a first message of random access is sent to a base station. The first message of random access includes first indication information, and the first indication information indicates a data amount of an uplink common control channel service data unit (CCCH SDU) included in a third message of random access to be sent.

In an example, the user equipment may initiate random access to the base station in many cases, which in turn send the first message of random access (hereinafter referred to as MSG1) to the base station. For example, in a case that the user equipment establishes a communication connection with the base station, in a case that the user equipment resumes a communication connection with the base station, in a case that the user equipment re-establishes a communication connection with the base station, in a case that the user equipment performs beam failure recovery, in a case that there is no available uplink resource for the user equipment to send a scheduling request, etc., which will not be described in detail herein.

In an example, MSG1 may include a random access preamble. The first indication information may be, for example, an index of the preamble or information on a preamble group to which the preamble belongs. The first indication information is not limited to the two cases. Information carried by MSG1 may be selected as the first indication information as required.

Taking the first indication information being the index of the preamble as an example, an odd-numbered index may indicate that the data amount of the uplink CCCH SDU is a first data amount, for example, 56 bits, and an even-numbered index may indicate that the data amount of the uplink CCCH SDU is a second data amount, for example, 88 bits.

At step S12, a second message of random access from the base station is received.

At step S13, the third message of random access is sent via uplink resources indicated by the second message of random access. A data amount allowable to be transmitted via the uplink resources is greater than or equal to the data amount of the uplink CCCH SDU.

In an example, after receiving MSG1, the base station may determine the data amount of the uplink CCCH SDU according to the first indication information in MSG1. For example, if the first indication information is an odd-numbered index of a preamble, the base station can determine that the data amount of the uplink CCCH SDU is the first data amount, and then generate the second message of random access (hereinafter referred to as MSG2) according to the first data amount. Thus, a data amount, that can be transmitted via the uplink resources indicated by MSG2, is greater than or equal to the first data amount. Therefore, it is ensured that the user equipment, when sending MSG3 according to the uplink resources indicated by MSG2, is able to send the uplink CCCH SDU included in MSG3 to the base station through a single send operation.

It should be noted that in addition to the uplink CCCH SDU, MSG3 may include other contents such as a MAC header. It is only required that the uplink resources allocated by the base station for the user equipment to transmit MSG3 are capable for transmitting a data amount greater than the data amount of the uplink CCCH SDU, and then the user equipment may complete the sending of MSG3 through one sending operation. The user equipment sends the uplink CCCH SDU first, and in a case where the sending of the uplink CCCH SDU is completed, MSG3 may be considered to have been sent.

According to the example of the present disclosure, the first indication information is carried in MSG1 to indicate the data amount of the uplink CCCH SDU included in MSG3, where MSG3 is to be sent by the user equipment, such that the base station may determine the data amount of the uplink CCCH SDU according to the first indication information, which in turn makes the data amount allowable to be transmitted via the uplink resources greater than or equal to the data amount of the uplink CCCH SDU, where the uplink resources is indicated by MSG2 and generated by the base station. Therefore, it is ensured that the user equipment may complete the sending of MSG3 in one sending operation according to the uplink resources indicated by MSG2. There is no need for the base station to allocate excessive uplink resources, thereby avoiding a waste of the uplink resources.

It should be noted that the data amount allowable to be transmitted via the uplink resources indicated by MSG 2 is, preferably, equal to the data amount of the uplink CCCH SDU. In a case where the data amount allowable to be transmitted via the uplink resources indicated by MSG2 is greater the data amount of the uplink CCCH SDU, the data amount allowable to be transmitted via the uplink resources may be 1 byte or 2 bytes greater than that of the uplink CCCH SDU, such that a MAC header may be sent through other data amount greater than the data amount of the uplink CCCH SDU.

Optionally, the first indication information may be referred to information on time/frequency resources used by the user equipment to send the first message of random access.

In an example, the user equipment may indicate the data amount of the uplink CCCH SDU in MSG3 to be sent through time/frequency resources where sent MSG1 is located, and the base station may determine the data amount of the uplink CCCH SDU according to the time/frequency resources where received MSG1 is located.

The time/frequency resources may be a physical random access channel (PRACH) transmission occasion. The user equipment can send MSG1 via the PRACH transmission occasion.

For example, the user equipment sends MSG1 at an odd-numbered PRACH transmission occasion upon triggering random access, which may indicate that the data amount of the uplink CCCH SDU in MSG3 to be sent is the first data amount. And the user equipment sends MSG1 at an even-numbered PRACH transmission occasion upon triggering random access, which may indicate that the data amount of the uplink CCCH SDU in MSG3 to be sent is the second data amount.

After receiving MSG1, the base station may determine the PRACH transmission occasion where MSG1 is located. If the PRACH transmission occasion where MSG1 is located is an odd-numbered PRACH transmission occasion upon triggering random access, the base station may determine that the data amount of the uplink CCCH SDU in MSG3 to be sent by the user equipment is the first data amount, which in turn makes a data amount allowable to be transmitted via the uplink resources indicated by resulting MSG2 greater than or equal to the first data amount. If the PRACH transmission occasion where MSG1 is located are an even-numbered PRACH transmission occasion upon triggering random access, the base station may determine that the data amount of the uplink CCCH SDU in MSG3 to be sent by the user equipment is the second data amount, which in turn makes a data amount allowable to be transmitted via the uplink resources indicated by resulting MSG2 greater than or equal to the second data amount.

It should be noted that, in addition to distinguishing the data amounts of the uplink CCCH SDUs according to the odd-numbered and even-numbered PRACH transmission occasions as described above, other ways of dividing the time/frequency resources may be used to distinguish the data amounts of the uplink CCCH SDUs. Moreover, the data amount of the uplink CCCH SDU is not limited to two types, and may be set as required.

In addition, the information on the time/frequency resources may be implicit, that is, the user equipment does not send the information on the time/frequency resources, but MSG1 can be sent through specific time/frequency resources as required. When receiving MSG1, the base station may determine time/frequency resources in which MSG1 is received, thereby determining the time/frequency resources where MSG1 is located, which in turn obtains the information on the time/frequency resources. The information on the time/frequency resources may be explicit, that is, the user equipment sends the information on the time/frequency resources. After receiving MSG1, the base station may determine the time/frequency resources where MSG1 is located according to the information on the time/frequency resources.

Optionally, the first indication information may be referred to an index of a preamble included in the first message of random access.

In an example, the user equipment may indicate the data amount of the uplink CCCH SDU in MSG3 to be sent through the index of the preamble in sent MSG1. The base station may determine the data amount of the uplink CCCH SDU according to the index of the preamble in received MSG1.

For example, the user equipment uses an odd-numbered index indicating that the data amount of the uplink CCCH SDU in MSG3 to be sent is the first data amount, and uses an even-numbered index indicating that the data amount of the uplink CCCH SDU in MSG3 to be sent is the second data amount. When receiving MSG1, the base station may determine the index of the preamble in MSG1. If the index is an odd number, the base station may determine that the data amount of the uplink CCCH SDU in MSG3 to be sent by the user equipment is the first data amount, and thus a data amount allowable to be transmitted via the uplink resources indicated by resulting MSG2 is greater than or equal to the first data amount. If the index is an even number, the base station may determine that the data amount of the uplink CCCH SDU in MSG3 to be sent by the user equipment is the second data amount, and thus a data amount allowable to be transmitted via the uplink resources indicated by resulting MSG2 is greater than or equal to the second data amount.

It should be noted that, in addition to distinguishing the data amounts of the uplink CCCH SDUs according to the odd-numbered and even-numbered indexes as described above, other ways of dividing the indexes may be used to distinguish the data amounts of the uplink CCCH SDUs. Moreover, the data amount of the uplink CCCH SDU is not limited to two types, and may be set as required.

Optionally, the first indication information may be referred to information on a preamble group to which a preamble included in the first message of random access belongs.

In an example, the user equipment may indicate the data amount of the uplink CCCH SDU in MSG3 to be sent through the information on the preamble group to which the preamble in sent MSG1 belongs. The base station may determine the data amount of the uplink CCCH SDU according to the information on the preamble group to which the preamble in received MSG1 belongs.

For example, the preamble may be chosen from two preamble groups. The user equipment sends a preamble in a first preamble group indicating that the data amount of the uplink CCCH SDU in MSG3 to be sent is the first data amount, and sends a preamble in a second preamble group indicating that the data amount of the uplink CCCH SDU in MSG3 to be sent is the second data amount. When receiving MSG1, the base station may determine the group to which the preamble in MSG1 belongs. If the preamble in MSG1 belongs to the first group, the base station may determine that the data amount of the uplink CCCH SDU in MSG3 to be sent by the user equipment is the first data amount, which in turn makes a data amount allowable to be transmitted via the uplink resources indicated by resulting MSG2 greater than or equal to the first data amount. If the preamble in MSG1 belongs to the second group, the base station may determine that the data amount of the uplink CCCH SDU in MSG3 to be sent by the user equipment is the second data amount, which in turn makes a data amount allowable to be transmitted via the uplink resources indicated by resulting MSG2 greater than or equal to the second data amount.

It should be noted that, the preamble groups are not limited to two groups, and a number of the preamble groups may be increased as required. Moreover, the data amount of the uplink CCCH SDU is not limited to two types, and may be set as required.

Optionally, the first indication information may be referred to a payload carried by a preamble included in the first message of random access.

In an example, the user equipment may indicate the data amount of the uplink CCCH SDU in MSG3 to be sent through the payload carried by the preamble in sent MSG1. Different payloads may include different fields. The base station may determine the data amount of the uplink CCCH SDU according to the payload carried by the preamble in received MSG1.

For example, the user equipment uses a payload including a first field to indicate that the data amount of the uplink CCCH SDU in MSG3 to be sent is the first data amount, and uses a payload including a second field to indicate that the data amount of the uplink CCCH SDU in MSG3 to be sent is the second data amount. When receiving MSG1, the base station may determine a field included in the payload carried by the preamble in MSG1. If the first field is included, the base station may determine that the data amount of the uplink CCCH SDU in MSG3 to be sent by the user equipment is the first data amount, and thus a data amount allowable to be transmitted via the uplink resources indicated by resulting MSG2 is greater than or equal to the first data amount. If the second field is included, the base station may determine that the data amount of the uplink CCCH SDU in MSG3 to be sent by the user equipment is the second data amount, and thus a data amount allowable to be transmitted via the uplink resources indicated by resulting MSG2 is greater than or equal to the second data amount.

It should be noted that, in addition to distinguishing the data amounts of the uplink CCCH SDUs according to different fields included in the payload, other ways of dividing the payload may be used to distinguish the data amounts of the uplink CCCH SDUs. Moreover, the data amount of the uplink CCCH SDU is not limited to two types, and may be set as required. The field included in the payload is not limited to two types, and may also be set as required.

Optionally, the first indication information may be referred to information on a scrambling code associated with a preamble included in the first message of random access.

In an example, the user equipment may indicate the data amount of the uplink CCCH SDU in MSG3 to be sent through the information on the scrambling code associated with the preamble in sent MSG1. The base station may determine the data amount of the uplink CCCH SDU according to the information on the scrambling code associated with the preamble in received MSG1.

For example, the user equipment uses a first scrambling code indicating that the data amount of the uplink CCCH SDU in MSG3 to be sent is the first data amount, and uses a second scrambling code indicating that the data amount of the uplink CCCH SDU in MSG3 to be sent is the second data amount. When receiving MSG1, the base station may determine the information on the scrambling code associated with the preamble in MSG1. If the scrambling code associated with the preamble is the first scrambling code, the base station may determine that the data amount of the uplink CCCH SDU in MSG3 to be sent by the user equipment is the first data amount, which in turn makes a data amount allowable to be transmitted via the uplink resources indicated by resulting MSG2 greater than or equal to the first data amount. If the scrambling code associated with the preamble is the second scrambling code, the base station may determine that the data amount of the uplink CCCH SDU in MSG3 to be sent by the user equipment is the second data amount, which in turn makes a data amount allowable to be transmitted via the uplink resources indicated by resulting MSG2 greater than or equal to the second data amount.

It should be noted that, the data amounts of the uplink CCCH SDUs are not limited to two types, and may be set as required. The scrambling code is not limited to two types, and may also be set as required.

Optionally, the first indication information indicates a type of the data amount of the uplink CCCH SDU included in the third message of random access, or the first indication information indicates a data amount of the uplink CCCH SDU and a MAC header included in the third message of random access.

In an example, the first indication information may be used specifically to indicate a type of the uplink CCCH SDU. Since different types of uplink CCCH SDUs have different data amounts, a data amount of an uplink CCCH SDU may be determined according to the type of the uplink CCCH SDU.

In an example, the first indication information may be used specifically to indicate the data amount of the uplink CCCH SDU and the MAC header. Since a data amount of the MAC header is fixed (typically 8 bits or 16 bits, and the base station and the user equipment can agree on the data amount of the MAC header in advance), the data amount of the uplink CCCH SDU can be determined by subtracting the fixed data amount of the MAC header from the data amount of the uplink CCCH SDU and the MAC header.

Optionally, the first message of random access further includes second indication information, and the second indication information indicates whether the third message of random access includes the uplink CCCH SDU.

In an example, MSG3 may not include the uplink CCCH SDU in some cases, and in the cases of not including the uplink CCCH SDU, a data amount required for the user equipment to send MSG3 is much smaller than that in cases of including the uplink CCCH SDU.

For example, in a case where MSG3 includes the uplink CCCH SDU, the uplink CCCH SDU mainly has two data amounts: 48 bits and 80 bits. In a case where MSG3 does not include the uplink CCCH SDU, contents included in MSG3 have a data amount less than 48 bits, that is, the data amount required for the user equipment to send MSG3 is less than 48 bits.

In this case, the base station may determine whether MSG3 includes the uplink CCCH SDU according to the second indication information. If it is determined that MSG3 does not include the uplink CCCH SDU, the data amount allowable to be transmitted via the uplink resources indicated by resulting MSG2 may be less than 48 bits, thereby avoiding a waste of the uplink resources.

It should be noted that, MSG1 may include both the first indication information and the second indication information. The base station may firstly determine whether MSG3 includes the uplink CCCH SDU according to the second indication information. If MSG3 does not include the uplink CCCH SDU, there is no need to determine the data amount of the uplink CCCH SDU according to the first indication information, thereby reducing resource consumption of the base station. If MSG3 includes the uplink CCCH SDU, the data amount of the uplink CCCH SDU is further determined according to the first indication information.

In addition, the first indication information and the second indication information may be of the same type. Based on this, it is convenient for the user equipment to indicate multiple contents through one type of information.

For example, the first indication information and the second indication information may be referred to information on time/frequency resources used by MSG1. The user equipment sends MSG1 through a transmission occasion in a part of PRACH transmission occasions to indicate whether MSG3 includes the uplink CCCH SDU. For example, MSG1 is sent through a first transmission occasion in this part of transmission occasions, which indicates that MSG3 includes the uplink CCCH SDU. MSG1 is sent through a second transmission occasion in this part of transmission occasions, which indicates that MSG3 does not include the uplink CCCH SDU. The user equipment sends MSG1 through a transmission occasion in the other part of the PRACH transmission occasions to indicate the data amount of the uplink CCCH SDU. For example, MSG1 is sent through a third transmission occasion in the other part of transmission occasions, which indicates that the data amount of the uplink CCCH SDU is the first data amount, and MSG1 is sent through a fourth transmission occasion in the other part of transmission occasions, which indicates that the data amount of the uplink CCCH SDU is the second data amount.

For example, the first indication information and the second indication information may be referred to an index of a preamble in MSG1. The user equipment sends MSG1 including an index in a part of indexes of preambles to indicate whether MSG3 includes the uplink CCCH SDU. For example, a first index in this part of indexes of preambles included in sent MSG1 indicates that MSG3 includes the uplink CCCH SDU, and a second index in this part of indexes of preambles included in sent MSG1 indicates that MSG3 does not include the uplink CCCH SDU. The user equipment sends MSG1 including an index in the other part of indexes of preambles to indicate the data amount of the uplink CCCH SDU. For example, a third index in the other part of indexes of preambles included in sent MSG1 indicates that the data amount of the uplink CCCH SDU is the first data amount, and a fourth index in the other part of indexes of preambles included in sent MSG1 indicates that the data amount of the uplink CCCH SDU is the second data amount.

Similarly, both of the first indication information and the second indication information may be information on a preamble group to which a preamble in MSG1 belongs, or a payload carried by a preamble in MSG1, or information on a scrambling code associated with a preamble in MSG1. The specific representation is not repeated here.

In addition, in an example, the preamble group may include two preamble groups: Group A and Group B. According to a relationship between a data amount of MSG3 to be sent and a first preset data amount, the user equipment may determine whether to select a preamble from Group A or Group B to send the preamble to the base station.

For example, if the user equipment determines that a third data amount of MSG3 to be sent is less than the first preset data amount, a preamble selecting from Group A is sent to the base station. The base station determines that the received preamble belongs to Group A, and uplink resources indicated by resulting MSG2 are capable for transmitting the third data amount. For example, if the user equipment determines that a fourth data amount of MSG3 to be sent is greater than or equal to the first preset data amount, a preamble selecting from Group B is sent to the base station. The base station determines that the received preamble belongs to Group B, and the uplink resources indicated by resulting MSG2 are capable for transmitting the fourth data amount.

In a case where the preamble group includes two preamble groups, according to a relationship between the data amount of the uplink CCCH SDU in MSG3 to be sent and a second preset data amount, the user equipment may determine whether to select a preamble from Group A or Group B to send the preamble to the base station.

For example, if the user equipment determines that a first data amount of the uplink CCCH SDU is less than the second preset data amount, a preamble selecting from Group A is sent to the base station. The base station determines that the received preamble belongs to Group A, and uplink resources indicated by resulting MSG2 are capable for transmitting the first data amount. For example, if the user equipment determines that a second data amount of MSG3 to be sent is greater than or equal to the second preset data amount, a preamble selecting from Group B is sent to the base station. The base station determines that the received preamble belongs to Group B, and the uplink resources indicated by resulting MSG2 are capable for transmitting the second data amount.

The first preset data amount and the second preset data amount may be preset by the base station and the user equipment, for example, as specified in a communication protocol. Alternatively, the base station may notify the user equipment of the first preset data amount and the second preset data amount via broadcast. Alternatively, the base station indicates the first preset data amount and the second preset data amount to the user equipment through an RRC (Radio Resource Control) message.

Figure 2:
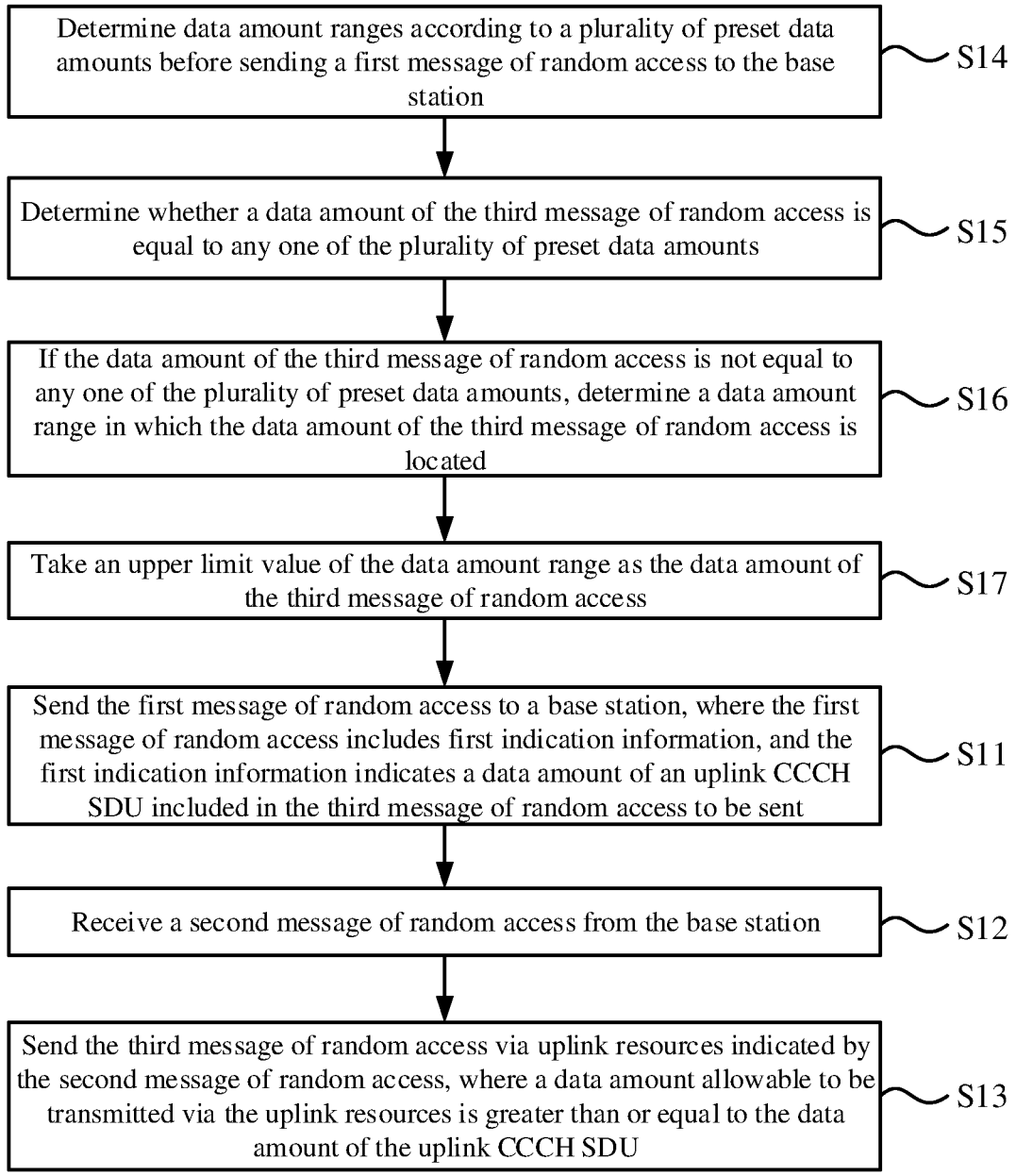
FIG. 2 is a schematic flowchart illustrating another message sending method according to an example of the present disclosure.

FIG. 2 is a schematic flowchart illustrating another message sending method according to an example of the present disclosure. As shown in FIG. 2, the message sending method further includes the followings.

At step S14, before the first message of random access is sent to the base station, data amount ranges are determined according to a plurality of preset data amounts.

At step S15, it is determined whether a data amount of the third message of random access is equal to any one of the plurality of preset data amounts.

At step S16, if the data amount of the third message of random access is not equal to any one of the plurality of preset data amounts, a data amount range in which the data amount of the third message of random access is located is determined.

At step S17, an upper limit value of the data amount range is taken as the data amount of the third message of random access.

In an example, the data amounts of MSG3 are different because different contents included in MSG3. If first indication information is respectively generated for all the different data amounts of MSG3, the first indication information may include a large number of situations, which will cause the base station to frequently change the uplink resources for allocating appropriate uplink resources to the user equipment, and thereby causing a lot of burden to the base station.

According to this example, the data amount ranges may be determined firstly according to the plurality of preset data amounts. The preset data amount may be set as required. For example, the preset data amount may be the data amount of the uplink CCCH SDU, which, for example, has two data amounts: 48 bits and 80 bits according to types of the uplink CCCH SDU. Therefore, the determined data amount ranges are 0 to 48 bits, and 49 to 80 bits.

Further, if the data amount of MSG3 is not equal to any of the preset data amounts, the upper limit value of the data amount range in which the data amount of MSG3 is located may be used as the data amount of MSG3. For example, assuming that a data amount of MSG3 is 36 bits, it is neither equal to 48 bits nor 80 bits, but belongs to the data amount range of 0 to 48 bits. In this way, 48 bits may be used as the data amount of MSG3 (an actual data amount of MSG3 has not been changed), and a data amount allowable to be transmitted via the uplink resources indicated by MSG2 from the base station is 48 bits. In this way, the uplink resources indicated by the base station through MSG2 need only to be suitable for transmitting data amounts corresponding to upper limit values of several data amount ranges respectively. On the basis of ensuring that the user equipment may complete the sending of MSG3 through one uplink transmission according to the uplink resources indicated by the base station, the base station is avoided from frequently adjusting the uplink resources indicated by MSG2, thereby reducing the burden of the base station.

Figure 3:
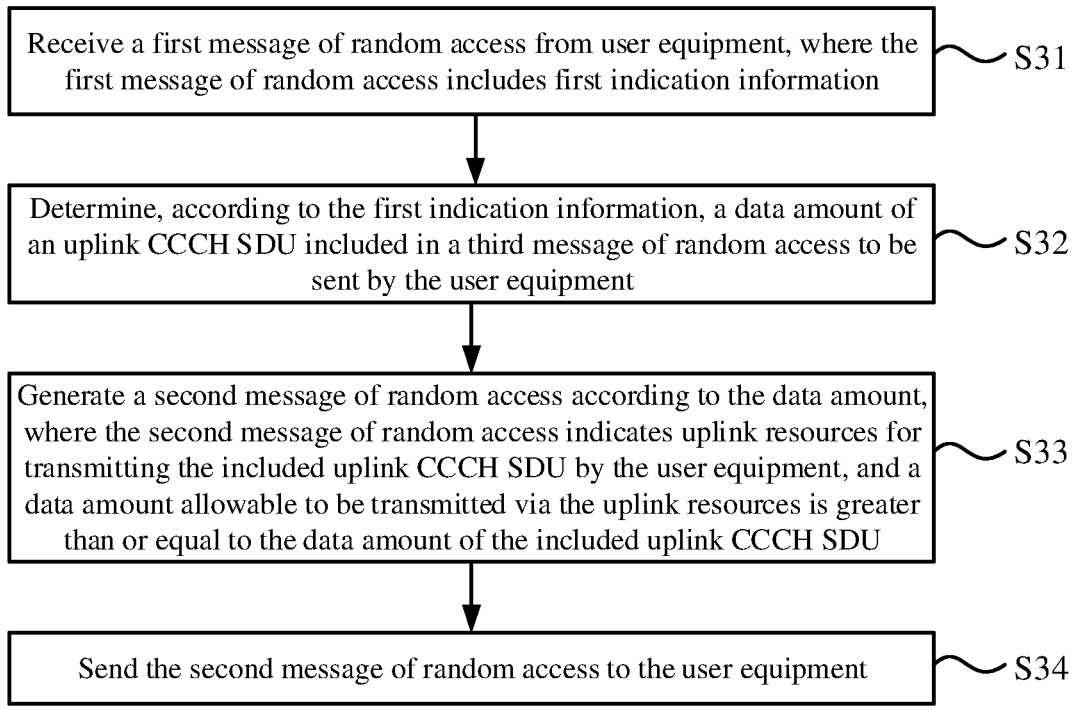
FIG. 3 is a schematic flowchart illustrating a resource allocating method according to an example of the present disclosure.

FIG. 3 is a schematic flowchart illustrating a resource allocating method according to an example of the present disclosure. The resource allocating method described in this example may be applicable to a base station, such as a 4G base station, a 5G base station, and so on. The base station can communicate with user equipment.

As shown in FIG. 3, the resource allocating method includes the following steps.

At step S31, a first message of random access from user equipment is received. The first message of random access includes first indication information.

At step S32, a data amount of an uplink CCCH SDU included in a third message of random access to be sent by the user equipment is determined according to the first indication information.

At step S33, a second message of random access is generated according to the data amount. The second message of random access indicates uplink resources for transmitting the included uplink CCCH SDU by the user equipment. A data amount allowable to be transmitted via the uplink resources is greater than or equal to the data amount of the included uplink CCCH SDU.

At step S34, the second message of random access is sent to the user equipment.

In an example, corresponding to the example shown in FIG. 1, the user equipment indicates the data amount of the uplink CCCH SDU included in MSG3 to be sent via the first indication information carried in MSG1, such that the base station can determine the data amount of the uplink CCCH SDU according to the first indication information, and then the uplink resources indicated by generated MSG2 are capable for transmitting a data amount, where this data amount is greater than or equal to the data amount of the uplink CCCH SDU. Therefore, it is ensured that the user equipment may complete the sending of MSG3 through a single sending operation according to the uplink resources indicated by MSG2. There is no need for the base station to allocate excessive uplink resources, thereby avoiding a waste of the uplink resources.

Figure 4:
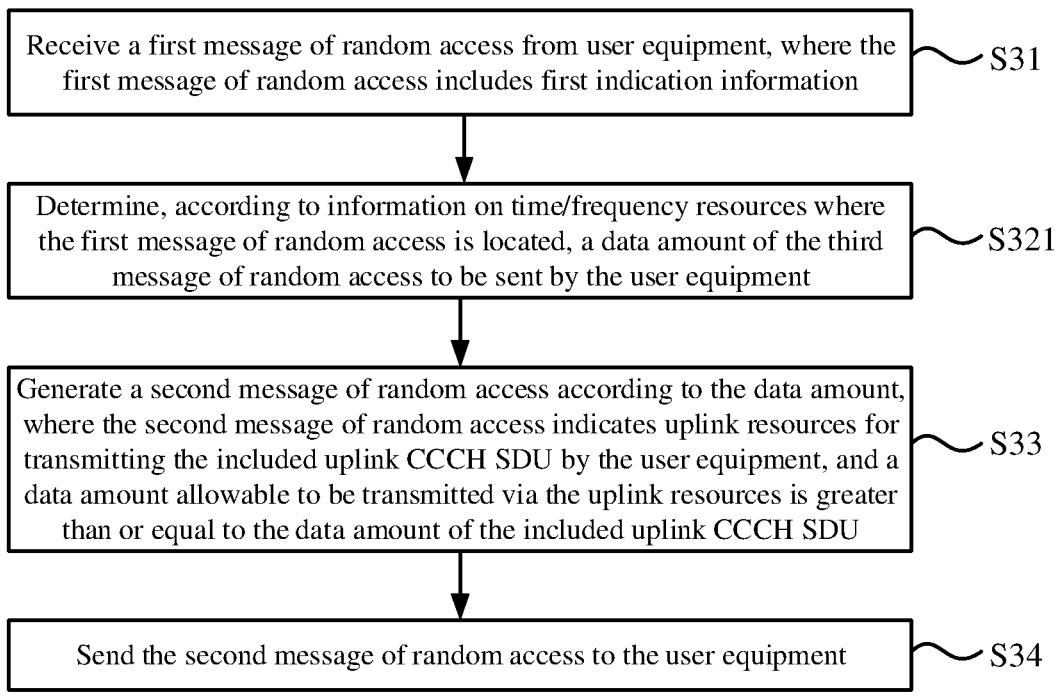
FIG. 4 is a schematic flowchart illustrating another resource allocating method according to an example of the present disclosure.

FIG. 4 is a schematic flowchart illustrating another resource allocating method according to an example of the present disclosure. As shown in FIG. 4, on the basis of the example shown in FIG. 3, determining a data amount of the third message of random access to be sent by the user equipment according to the first indication information, includes step S321.

At step S321, a data amount of the third message of random access to be sent by the user equipment is determined according to information on time/frequency resources where the first message of random access is located.

In an example, the user equipment may indicate the data amount of the uplink CCCH SDU in MSG3 to be sent via the time/frequency resources where sent MSG1 is located, and the base station may determine the data amount of the uplink CCCH SDU according to the time/frequency resources where received MSG1 is located.

Figure 5:
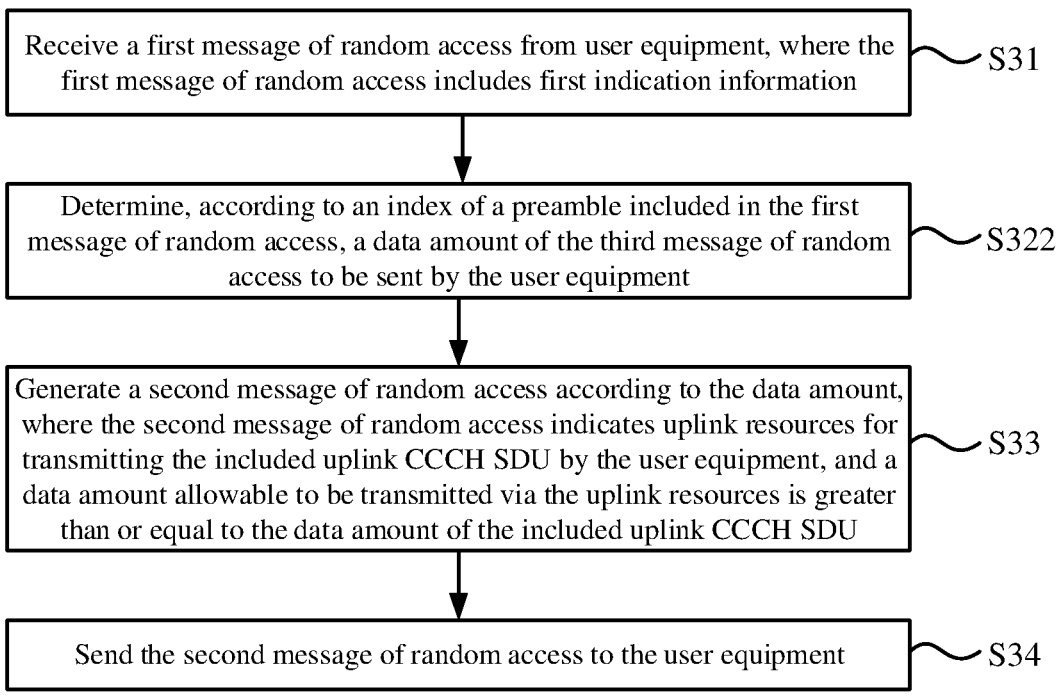
FIG. 5 is a schematic flowchart illustrating still another resource allocating method according to an example of the present disclosure.

FIG. 5 is a schematic flowchart illustrating still another resource allocating method according to an example of the present disclosure. As shown in FIG. 5, on the basis of the example shown in FIG. 3, determining a data amount of the third message of random access to be sent by the user equipment according to the first indication information, includes step S322.

At step S322, a data amount of the third message of random access to be sent by the user equipment is determined according to an index of a preamble included in the first message of random access.

In an example, the user equipment may indicate the data amount of the uplink CCCH SDU in MSG3 to be sent via the index of the preamble in sent MSG1. The base station may determine the data amount of the uplink CCCH SDU according to the index of the preamble in received MSG1.

Figure 6:
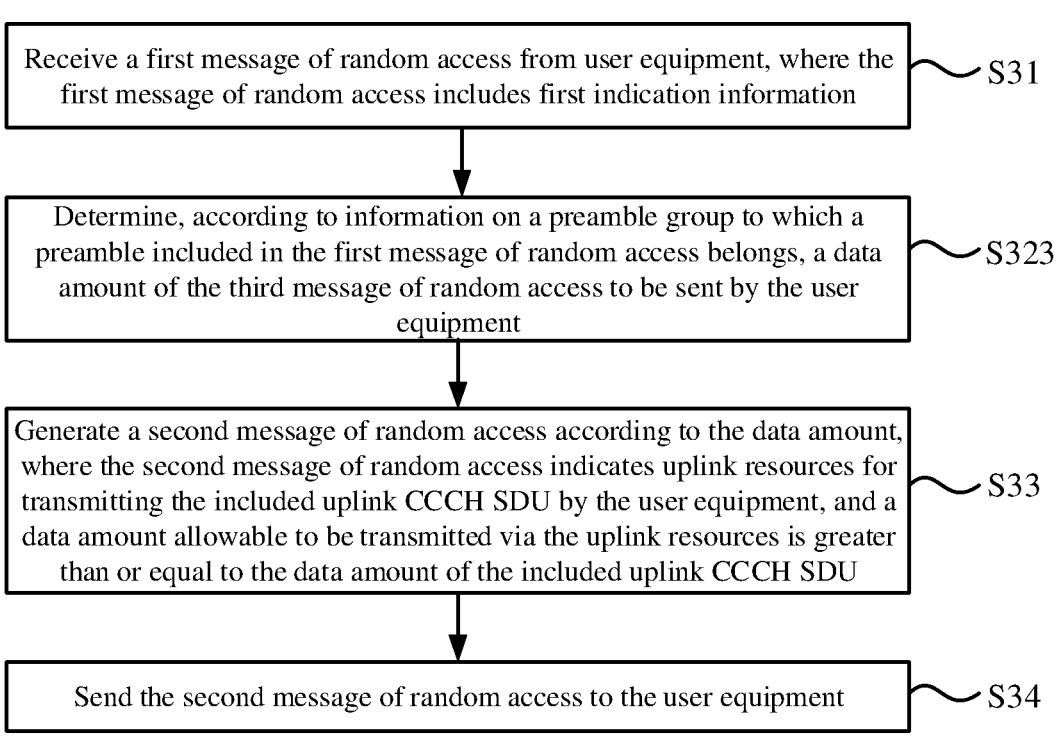
FIG. 6 is a schematic flowchart illustrating still another resource allocating method according to an example of the present disclosure.

FIG. 6 is a schematic flowchart illustrating still another resource allocating method according to an example of the present disclosure. As shown in FIG. 6, on the basis of the example shown in FIG. 3, determining a data amount of the third message of random access to be sent by the user equipment according to the first indication information, includes step S323.

At step S323, a data amount of the third message of random access to be sent by the user equipment is determined according to information on a preamble group to which a preamble included in the first message of random access belongs.

In an example, the user equipment may indicate the data amount of the uplink CCCH SDU in MSG3 to be sent via the information on the preamble group to which the preamble in sent MSG1 belongs. The base station may determine the data amount of the uplink CCCH SDU according to the information on the preamble group to which the preamble in received MSG1 belongs.

Figure 7:
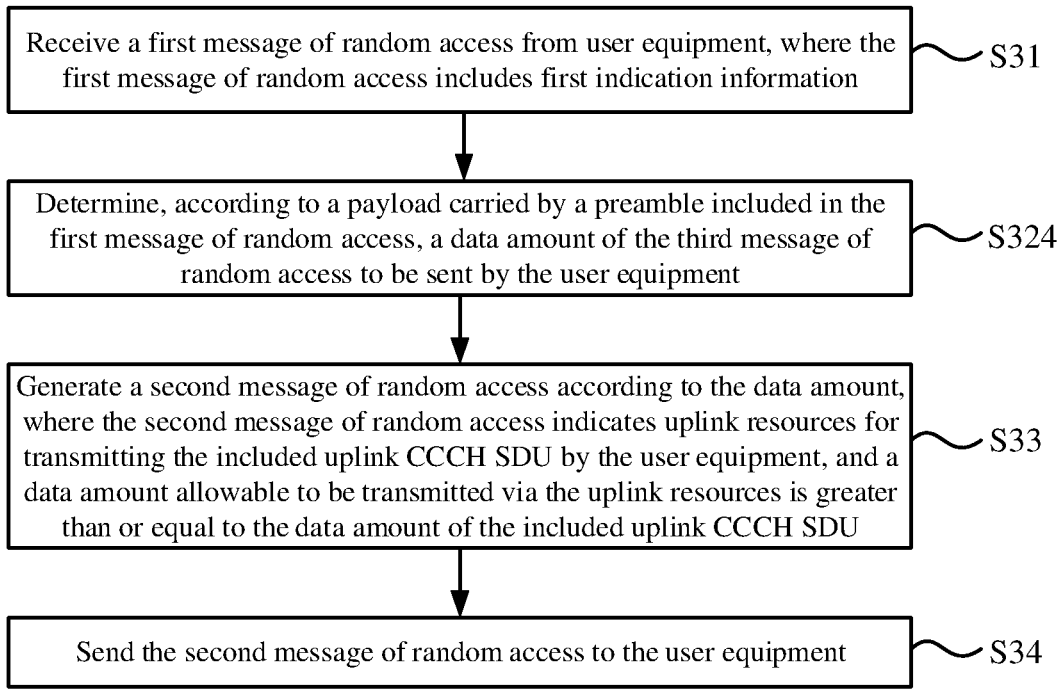
FIG. 7 is a schematic flowchart illustrating still another resource allocating method according to an example of the present disclosure.

FIG. 7 is a schematic flowchart illustrating still another resource allocating method according to an example of the present disclosure. As shown in FIG. 7, on the basis of the example shown in FIG. 3, determining a data amount of the third message of random access to be sent by the user equipment according to the first indication information, includes step S324.

At step S324, a data amount of the third message of random access to be sent by the user equipment is determined according to a payload carried by a preamble included in the first message of random access.

In an example, the user equipment may indicate the data amount of the uplink CCCH SDU in MSG3 to be sent via the payload carried by the preamble included in sent MSG1. The base station may determine the data amount of the uplink CCCH SDU according to the payload carried by the preamble in received MSG1.

Figure 8:
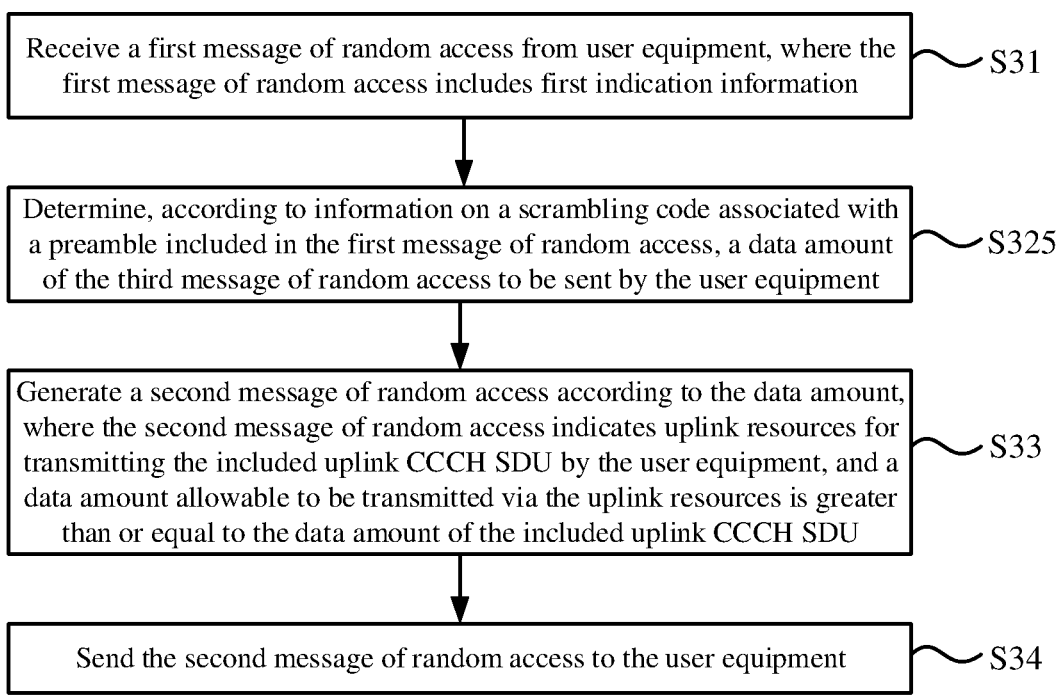
FIG. 8 is a schematic flowchart illustrating still another resource allocating method according to an example of the present disclosure.

FIG. 8 is a schematic flowchart illustrating still another resource allocating method according to an example of the present disclosure. As shown in FIG. 8, on the basis of the example shown in FIG. 3, determining a data amount of the third message of random access to be sent by the user equipment according to the first indication information, includes step S325.

At step S325, a data amount of the third message of random access to be sent by the user equipment is determined according to information on a scrambling code associated with a preamble included in the first message of random access.

In an example, the user equipment may indicate the data amount of the uplink CCCH SDU in MSG3 to be sent via the information on the scrambling code associated with the preamble in sent MSG1. The base station may determine the data amount of the uplink CCCH SDU according to the information on the scrambling code associated with the preamble in received MSG1.

Figure 9:
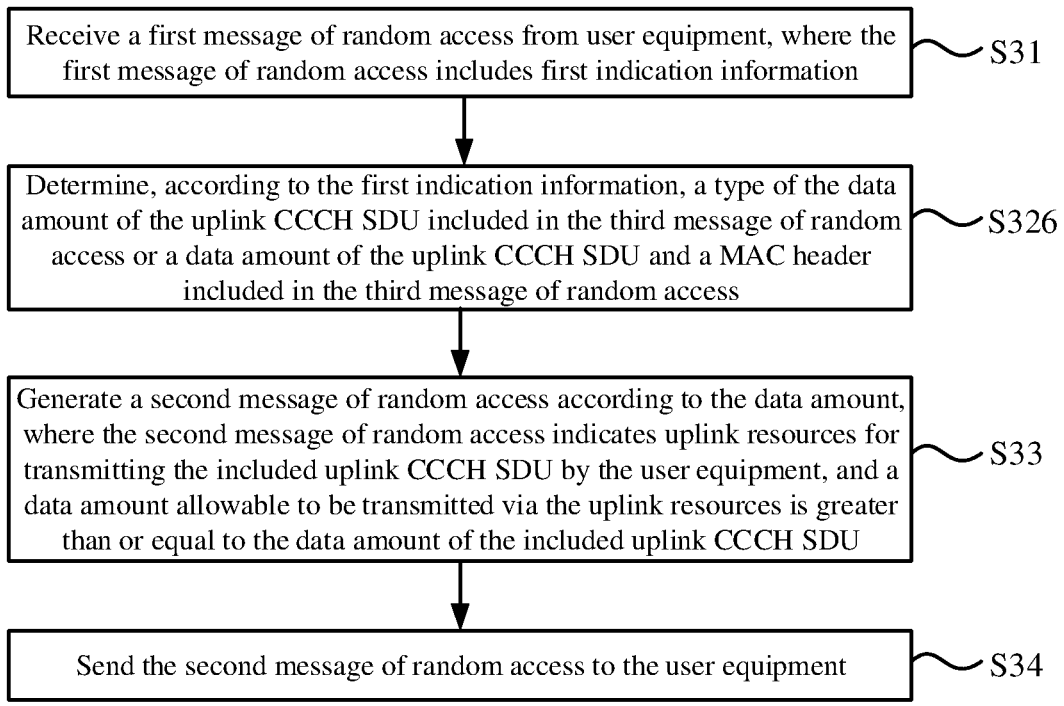
FIG. 9 is a schematic flowchart illustrating still another resource allocating method according to an example of the present disclosure.

FIG. 9 is a schematic flowchart illustrating still another resource allocating method according to an example of the present disclosure. As shown in FIG. 9, on the basis of the example shown in FIG. 3, determining a data amount of the third message of random access to be sent by the user equipment according to the first indication information, includes step S326.

At step S326, a type of the data amount of the uplink CCCH SDU included in the third message of random access is determined according to the first indication information; or a data amount of the uplink CCCH SDU and a MAC header included in the third message of random access is determined according to the first indication information.

In an example, the first indication information may be used specifically to indicate a type of the uplink CCCH SDU. Since different types of CCCH SDUs have different data amounts, the base station may determine a data amount of an uplink CCCH SDU according to the type of the uplink CCCH SDU.

In an example, the first indication information may be used specifically to indicate the data amount of the uplink CCCH SDUs and the MAC header. Since a data amount of the MAC header is fixed (typically 8 bits or 16 bits, and the base station and the user equipment can agree on the data amount of the MAC header in advance), the base station may determine the data amount of the uplink CCCH SDU by subtracting the fixed data amount of the MAC header from the data amount of the uplink CCCH SDUs and the MAC header.

Figure 10:
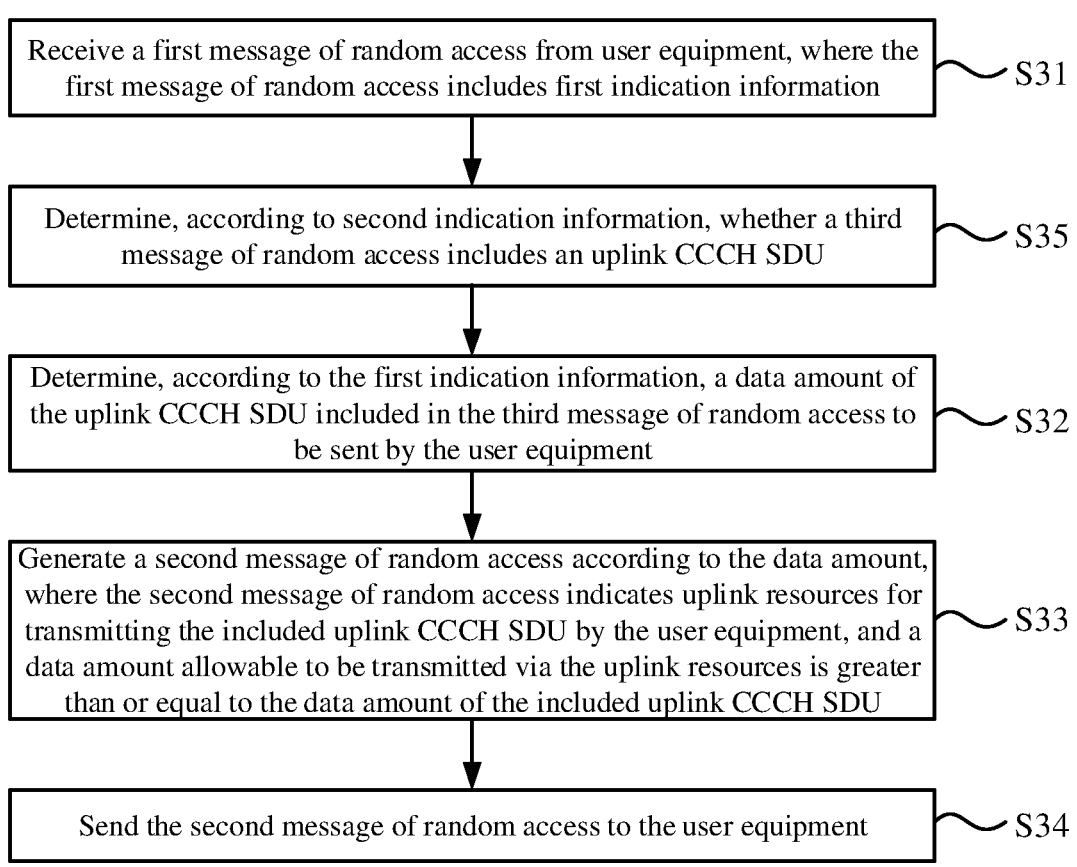
FIG. 10 is a schematic flowchart illustrating still another resource allocating method according to an example of the present disclosure.

FIG. 10 is a schematic flowchart illustrating still another resource allocating method according to an example of the present disclosure. As shown in FIG. 10, on the basis of the example shown in FIG. 3, the first message of random access includes second indication information, and the method further includes step S35.

At step S35, whether the third message of random access includes the uplink CCCH SDU is determined according to the second indication information.

In an example, MSG3 may not include the uplink CCCH SDU in some cases. In these cases, the base station may determine whether MSG3 includes the uplink CCCH SDU according to the second indication information, and if it is determined that MSG3 does not include the uplink CCCH SDU, the data amount allowable to be transmitted via the uplink resources indicated by resulting MSG2 may be less than 48 bits, thereby avoiding a waste of the uplink resources.

It should be noted that, MSG1 may include both the first indication information and the second indication information. The base station may firstly determine whether MSG3 includes the uplink CCCH SDU according to the second indication information. If MSG3 does not include the uplink CCCH SDU, there is no need to determine the data amount of the uplink CCCH SDU according to the first indication information, thereby reducing resource consumption of the base station. If MSG3 includes the uplink CCCH SDU, the data amount of the uplink CCCH SDU is further determined according to the first indication information.

Corresponding to the examples of the message sending methods and the resource allocating methods, the present disclosure further provides examples of message sending apparatuses and resource allocating apparatuses.

Figure 11:
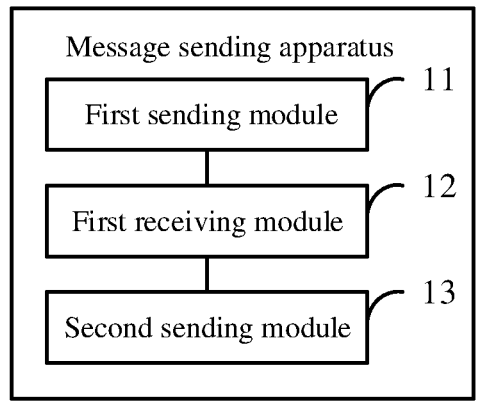
FIG. 11 is a schematic block diagram illustrating a message sending apparatus according to an example of the present disclosure.

FIG. 11 is a schematic block diagram illustrating a message sending apparatus according to an example of the present disclosure. The message sending apparatus described in this example may be applicable to user equipment, such as a mobile phone, a tablet computer, and so on. The user equipment may communicate with a base station.

As shown in FIG. 11, the message sending apparatus may include:

a first sending module 11 configured to send a first message of random access to a base station, where the first message of random access includes first indication information, and the first indication information indicates a data amount of an uplink CCCH SDU included in a third message of random access to be sent;

a first receiving module 12 configured to receive a second message of random access from the base station; and a second sending module 13 configured to send the third message of random access via uplink resources indicated by the second message of random access, where a data amount allowable to be transmitted via the uplink resources is greater than or equal to the data amount of the uplink CCCH SDU.

Optionally, the first indication information is information on time/frequency resources used by the user equipment to send the first message of random access.

Optionally, the first indication information is an index of a preamble included in the first message of random access.

Optionally, the first indication information is information on a preamble group to which a preamble included in the first message of random access belongs.

Optionally, the first indication information is a payload carried by a preamble included in the first message of random access.

Optionally, the first indication information is information on a scrambling code associated with a preamble included in the first message of random access.

Optionally, the first indication information indicates a type of the data amount of the uplink CCCH SDU included in the third message of random access; or the first indication information indicates a data amount of the uplink CCCH SDU and a MAC header included in the third message of random access.

Optionally, the first message of random access further includes second indication information, and the second indication information indicates whether the third message of random access includes the uplink CCCH SDU.

Figure 12:
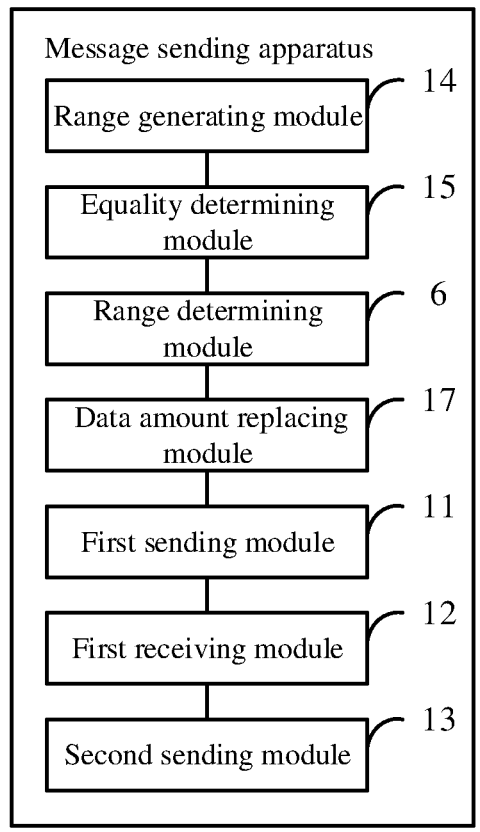
FIG. 12 is a schematic block diagram illustrating another message sending apparatus according to an example of the present disclosure.

FIG. 12 is a schematic block diagram illustrating another message sending apparatus according to an example of the present disclosure. As shown in FIG. 12, on the basis of the example shown in FIG. 11, the message sending apparatus further includes:

a range generating module 14 configured to, before sending the first message of random access to the base station, determine data amount ranges according to a plurality of preset data amounts;

an equality determining module 15 configured to determine whether a data amount of the third message of random access is equal to any one of the plurality of preset data amounts;

a range determining module 16 configured to, if the data amount of the third message of random access is not equal to any one of the plurality of preset data amounts, determine a data amount range in which the data amount of the third message of random access is located; and a data amount replacing module 17 configured to take an upper limit value of the data amount range as the data amount of the third message of random access.

Figure 13:
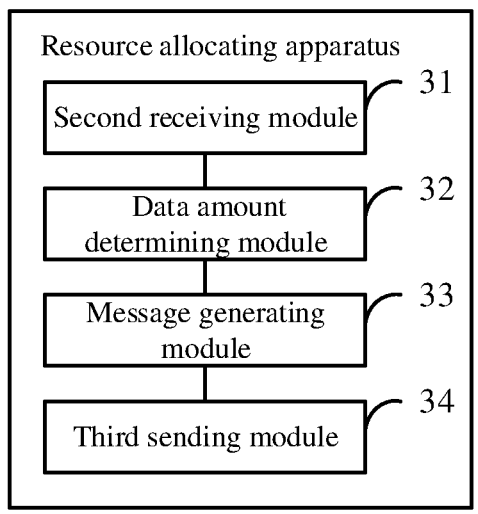
FIG. 13 is a schematic block diagram illustrating a resource allocating apparatus according to an example of the present disclosure.

FIG. 13 is a schematic block diagram illustrating a resource allocating apparatus according to an example of the present disclosure. The resource allocating apparatus described in this example may be applicable to a base station, such as a 4G base station, a 5G base station, and so on. The base station may communicate with user equipment.

As shown in FIG. 13, the resource allocating apparatus may include:

a second receiving module 31 configured to receive a first message of random access from user equipment, where the first message of random access includes first indication information;

a data amount determining module 32 configured to determine, according to the first indication information, a data amount of an uplink CCCH SDU included in a third message of random access to be sent by the user equipment;

a message generating module 33 configured to generate a second message of random access according to the data amount, where the second message of random access indicates uplink resources for transmitting the included uplink CCCH SDU by the user equipment, and a data amount allowable to be transmitted via the uplink resources is greater than or equal to the data amount of the included uplink CCCH SDU; and a third sending module 34 configured to send the second message of random access to the user equipment.

Optionally, the data amount determining module is configured to determine, according to information on time/frequency resources where the first message of random access is located, a data amount of the third message of random access to be sent by the user equipment.

Optionally, the data amount determining module is configured to determine, according to an index of a preamble included in the first message of random access, a data amount of the third message of random access to be sent by the user equipment.

Optionally, the data amount determining module is configured to determine, according to information on a preamble group to which a preamble included in the first message of random access belongs, a data amount of the third message of random access to be sent by the user equipment.

Optionally, the data amount determining module is configured to determine, according to a payload carried by a preamble included in the first message of random access, a data amount of the third message of random access to be sent by the user equipment.

Optionally, the data amount determining module is configured to determine, according to information on a scrambling code associated with a preamble included in the first message of random access, a data amount of the third message of random access to be sent by the user equipment.

Optionally, the data amount determining module is configured to determine, according to the first indication information, a type of the data amount of the uplink CCCH SDU included in the third message of random access; or determine, according to the first indication information, a data amount of the uplink CCCH SDU and a MAC header included in the third message of random access.

Figure 14:
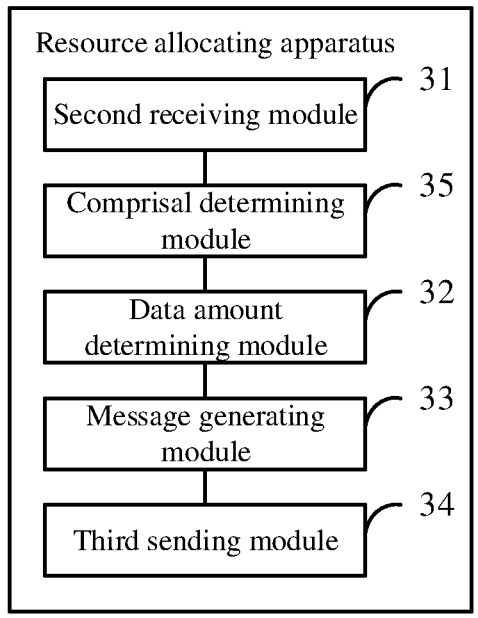
FIG. 14 is a schematic block diagram illustrating another resource allocating apparatus according to an example of the present disclosure.

FIG. 14 is a schematic block diagram illustrating another resource allocating apparatus according to an example of the present disclosure. As shown in FIG. 14, on the basis of the example shown in FIG. 13, the first message of random access includes second indication information, and the apparatus further includes:

a comprisal determining module 35 configured to determine, according to the second indication information, whether the third message of random access includes the uplink CCCH SDU.

Regarding the apparatuses in the above examples, the specific manner in which each module performs operations has been described in detail in the examples of the related methods, and will not be elaborated here.

For the apparatus examples, since they basically correspond to the method examples, reference may be made to the partial description of the method examples. The apparatus examples described above are merely illustrative, where the units described as separate components may or may not be physically separated, and the components displayed as units may or may not be physical units, i.e., may be located in one place or may be distributed to multiple network units. Some or all of the modules may be selected according to actual needs to achieve the objectives of the present disclosure. Those of ordinary skill in the art can understand and implement the present disclosure without any creative effort.

An example of the present disclosure further provides an electronic device, including:

a processor; and a memory for storing instructions executable by the processor, where the processor is configured to perform the message sending method according to any of the examples as described above.

An example of the present disclosure further provides an electronic device, including:

a processor; and a memory for storing instructions executable by the processor, where the processor is configured to perform the resource allocating method according to any of the examples as described above.

An example of the present disclosure further provides a computer readable storage medium having a computer program stored thereon, where the program is executed by a processor to perform steps in the message sending method according to any of the examples as described above.

An example of the present disclosure further provides a computer readable storage medium having a computer program stored thereon, where the program is executed by a processor to perform steps in the resource allocating method according to any of the examples as described above.

Figure 15:
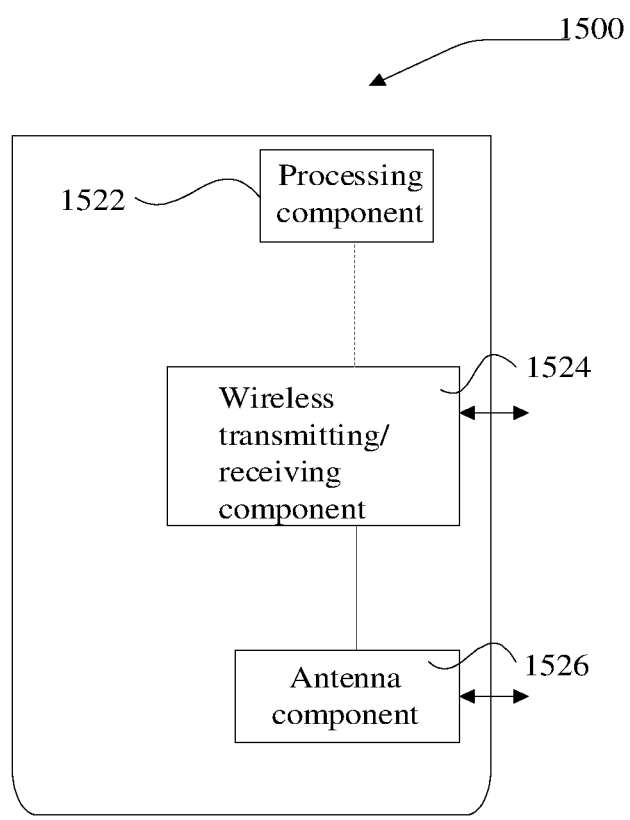
FIG. 15 is a schematic block diagram illustrating an apparatus for allocating a resource according to an example of the present disclosure.

FIG. 15 is a schematic block diagram illustrating an apparatus 1500 for allocating a resource according to an example of the present disclosure. The apparatus 1500 may be provided to a base station. Referring to FIG. 15, the apparatus 1500 includes a processing component 1522, a wireless transmitting/receiving component 1524, an antenna component 1526, and a signal processing portion specific to a wireless interface. The processing component 1522 may further include one or more processors. One of the processors in the processing component 1522 may be configured to perform steps in a resource allocation method according to any of the examples as described above.

Figure 16:
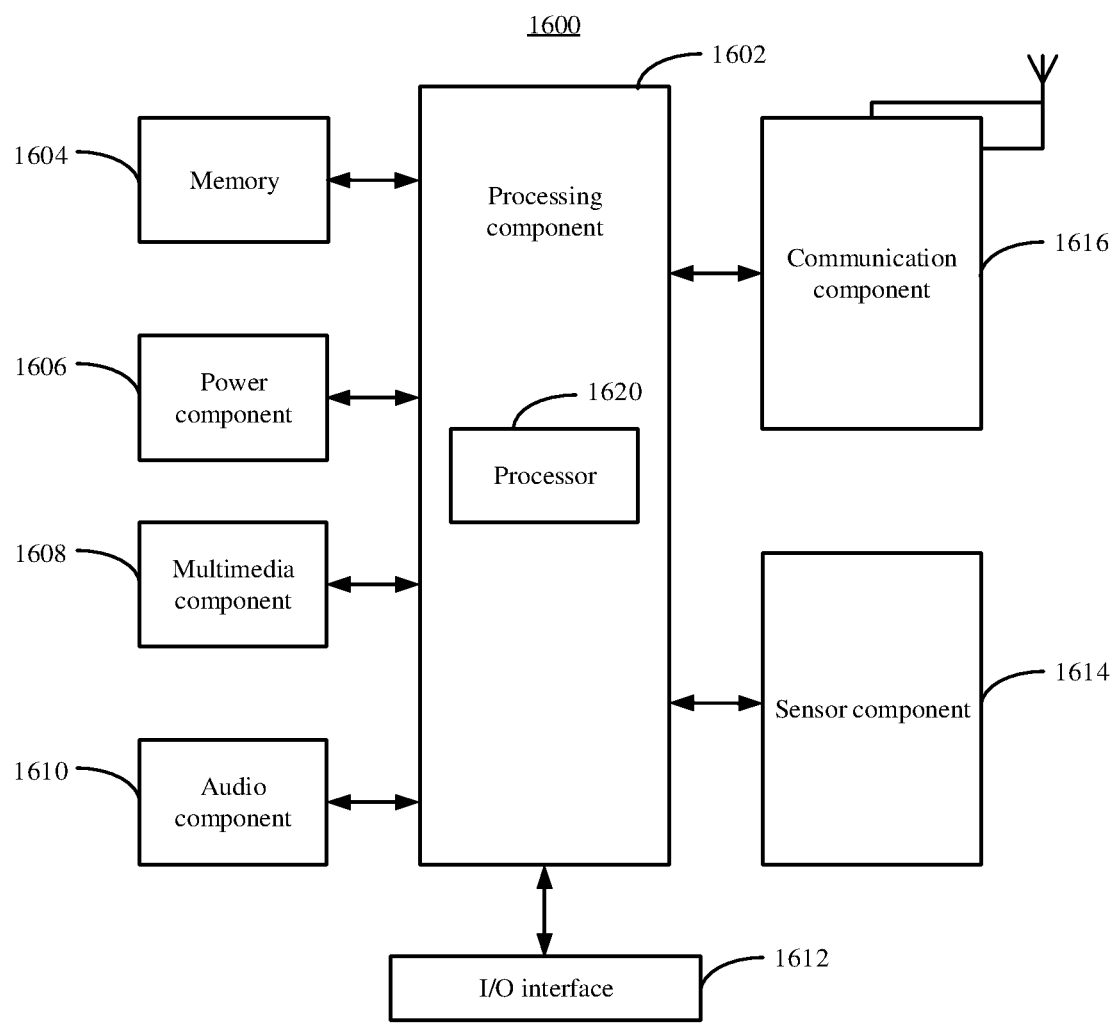
FIG. 16 is a schematic block diagram illustrating an apparatus for sending a message according to an example of the present disclosure.

FIG. 16 is a schematic block diagram illustrating an apparatus 1600 for sending a message according to an example of the present disclosure. For example, the apparatus 1600 may be a mobile phone, a computer, a digital broadcast terminal, a messaging device, a game console, a tablet device, a medical equipment, a fitness equipment, a personal digital assistant, etc.

Referring to FIG. 16, the apparatus 1600 may include one or more of the following components: a processing component 1602, a memory 1604, a power component 1606, a multimedia component 1608, an audio component 1610, an input/output (I/O) interface 1612, a sensor component 1614, and a communication component 1616.

The processing component 1602 usually controls the overall operation of the apparatus 1600, such as operations associated with display, telephone calls, data communications, camera operations, and recording operations. The processing component 1602 may include one or more processors 1620 to execute instructions to perform all or part of the steps in the methods described above. Moreover, the processing component 1602 may include one or more modules to facilitate interaction between the processing component 1602 and other components. For example, the processing component 1602 may include a multimedia module to facilitate interaction between the multimedia component 1608 and the processing component 1602.

The memory 1604 is configured to store various types of data to support operation at the apparatus 1600. Examples of these data include instructions for any application or method operating at the apparatus 1600, contact data, phone book data, messages, pictures, videos, and the like. The memory 1604 may be implemented by any type of volatile or non-volatile storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk.

The power component 1606 provides power to various components of the apparatus 1600. The power component 1606 may include a power management system, one or more power sources, and other components associated with power generated, managed, and distributed for the apparatus 1600.

The multimedia component 1608 includes a screen that provides an output interface between the apparatus 1600 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 1608 includes a front camera and/or a rear camera. When the apparatus 1600 is in an operation mode, such as a shooting mode or a video mode, the front camera and/or the rear camera may receive external multimedia data. Each of the front and rear cameras may be a fixed optical lens system or have a focal length and an optical zoom capability.

The audio component 1610 is configured to output and/or input audio signals. For example, the audio component 1610 includes a microphone (MIC) configured to receive an external audio signal when the apparatus 1600 is in an operation mode, such as a call mode, a recording mode, and a voice recognition mode. The received audio signal may be further stored in the memory 1604 or transmitted via the communication component 1616. In some examples, the audio component 1610 also includes a loudspeaker for outputting an audio signal.

The I/O interface 1612 provides an interface between the processing component 1602 and a peripheral interface module which may be a keyboard, a click wheel, a button, or the like. These buttons may include, but are not limited to a home button, a volume button, a start button, and a lock button.

The sensor component 1614 includes one or more sensors for providing a status assessment in various aspects to the apparatus 1600. For example, the sensor component 1614 may detect an open/closed state of the apparatus 1600, and the relative positioning of components, for example, the component is a display and a keypad of the apparatus 1600. The sensor component 1614 may also detect a change in position of the apparatus 1600 or a component of the apparatus 1600, the presence or absence of a user in contact with the apparatus 1600, the orientation or acceleration/deceleration of the apparatus 1600 and a change in temperature of the apparatus 1600. The sensor component 1614 may include a proximity sensor configured to detect the presence of nearby objects without any physical contact. The sensor component 1614 may also include a light sensor, such as a CMOS or CCD image sensor, for use in imaging applications. In some examples, the sensor component 1614 may also include an acceleration sensor, a gyro sensor, a magnetic sensor, a pressure sensor, or a temperature sensor.

The communication component 1616 is configured to facilitate wired or wireless communication between the apparatus 1600 and other devices. The apparatus 1600 may access a wireless network based on a communication standard, such as WiFi, 2G or 3G, or a combination thereof. In an example, the communication component 1616 receives broadcast signals or broadcast associated information from an external broadcast management system via a broadcast channel. In an example, the communication component 1616 also includes a near field communication (NFC) module to facilitate short range communication. For example, the NFC module may be implemented based on a radio frequency identification (RFID) technology, an infrared data association (IrDA) technology, an ultra wide band (UWB) technology, a Bluetooth (BT) technology, and other technologies.

In an example, the apparatus 1600 may be implemented by one or more application specific integrated circuits (ASICs), digital signal processors (DSPs), digital signal processing devices (DSPDs), programmable logic devices (PLDs), a field programmable gate array (FPGA), a controller, a microcontroller, a microprocessor or other electronic elements for performing a message sending method according to any of the examples as described above.

In an example, there is also provided a non-transitory computer readable storage medium including instructions, such as a memory 1604 including instructions, where the instructions are executable by the processor 1620 of the apparatus 1600 to perform the method as described above. For example, the non-transitory computer readable storage medium may be a ROM, a random access memory (RAM), a CD-ROM, a magnetic tape, a floppy disk, and an optical data storage device.

Other embodiments of the present disclosure will be readily apparent to those skilled in the art after considering the specification and practicing the contents disclosed herein. The present application is intended to cover any variations, uses, or adaptations of the present disclosure, which follow the general principle of the present disclosure and include common knowledge or conventional technical means in the art that are not disclosed in the present disclosure. The specification and examples are to be regarded as illustrative only. The true scope and spirit of the present disclosure are pointed out by the following claims.

It is to be understood that the present disclosure is not limited to the precise structures that have described and shown in the drawings, and various modifications and changes can be made without departing from the scope thereof. The scope of the disclosure is to be limited only by the appended claims.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

The above are detailed description of a method and an apparatus provided according to the embodiments of the present disclosure. Specific examples are used herein to set forth the principles and the implementing methods of the present disclosure, and the descriptions of the above embodiments are only meant to help understanding of the method and the core idea of the present disclosure. Meanwhile, those of ordinary skill in the art may make alterations to the specific embodiments and the scope of application in accordance with the idea of the present disclosure. In conclusion, the contents of the present specification shall not be interpreted as limiting to the present disclosure.

The invention claimed is:

1. A message sending method, being applicable to user equipment, and comprising:
 sending a first message of random access to a base station, wherein the first message of random access comprises first indication information, and the first indication information indicates a first data amount of an uplink common control channel service data unit (CCCH SDU) comprised in a third message of random access to be sent;
 receiving a second message of random access from the base station; and
 sending the third message of random access via uplink resources indicated by the second message of random access, wherein a data amount allowable to be transmitted via the uplink resources is greater than or equal to a second data amount of the third message of random access,
 wherein the first message of random access further comprises second indication information, and the second indication information indicates whether the third message of random access comprises the uplink CCCH SDU.

2. The method according to claim 1, wherein the first indication information is information on time/frequency resources used by the user equipment to send the first message of random access.

3. The method according to claim 1, wherein the first indication information is an index of a preamble comprised in the first message of random access.

4. The method according to claim 1, wherein the first indication information is information on a preamble group to which a preamble comprised in the first message of random access belongs.

5. The method according to claim 1, wherein the first indication information is a payload carried by a preamble comprised in the first message of random access.

6. The method according to claim 1, wherein the first indication information is information on a scrambling code associated with a preamble comprised in the first message of random access.

7. The method according to claim 1, wherein
 the first indication information indicates a type of the first data amount of the uplink CCCH SDU comprised in the third message of random access; or
 the first indication information indicates a third data amount of the uplink CCCH SDU and a media access control (MAC) header comprised in the third message of random access.

8. The method according to claim 1, further comprising:
 before sending the first message of random access to the base station, determining data amount ranges according to a plurality of preset data amounts;
 determining whether the second data amount of the third message of random access is equal to any one of the plurality of preset data amounts;
 in response to that the second data amount of the third message of random access is not equal to any one of the plurality of preset data amounts, determining a data amount range in which the second data amount of the third message of random access is located; and
 taking an upper limit value of the determined data amount range as the second data amount of the third message of random access.

9. A resource allocating method, being applicable to a base station, and comprising:
 receiving a first message of random access from user equipment, wherein the first message of random access comprises first indication information;
 determining, according to the first indication information, a first data amount of an uplink common control channel service data unit (CCCH SDU) comprised in a third message of random access to be sent by the user equipment;
 generating a second message of random access according to the first data amount, wherein the second message of random access indicates uplink resources for transmitting the comprised uplink CCCH SDU by the user equipment, and a data amount allowable to be transmitted via the uplink resources is greater than or equal to a second data amount of the third message of random access; and
 sending the second message of random access to the user equipment,
 wherein the first message of random access comprises second indication information, and the method further comprises:
 determining, according to the second indication information, whether the third message of random access comprises the uplink CCCH SDU.

10. The method according to claim 9, wherein determining, according to the first indication information, the first data amount of the uplink CCCH SDU comprised in the third message of random access to be sent by the user equipment comprises:
    determining, according to information on time/frequency resources where the first message of random access is located, the first data amount of the uplink CCCH SDU comprised in the third message of random access to be sent by the user equipment.

11. The method according to claim 9, wherein determining, according to the first indication information, the first data amount of the uplink CCCH SDU comprised in the third message of random access to be sent by the user equipment comprises:
    determining, according to an index of a preamble comprised in the first message of random access, the first data amount of the uplink CCCH SDU comprised in the third message of random access to be sent by the user equipment.

12. The method according to claim 9, wherein determining, according to the first indication information, the first data amount of the uplink CCCH SDU comprised in the third message of random access to be sent by the user equipment comprises:
    determining, according to information on a preamble group to which a preamble comprised in the first message of random access belongs, the first data amount of the uplink CCCH SDU comprised in the third message of random access to be sent by the user equipment.

13. The method according to claim 9, wherein determining, according to the first indication information, the first data amount of the uplink CCCH SDU comprised in the third message of random access to be sent by the user equipment comprises:
    determining, according to a payload carried by a preamble comprised in the first message of random access, the first data amount of the uplink CCCH SDU comprised in the third message of random access to be sent by the user equipment.

14. The method according to claim 9, wherein determining, according to the first indication information, the first data amount of the uplink CCCH SDU comprised in the third message of random access to be sent by the user equipment comprises:
    determining, according to information on a scrambling code associated with a preamble comprised in the first message of random access, the first data amount of the uplink CCCH SDU comprised in the third message of random access to be sent by the user equipment.

15. The method according to claim 9, wherein determining, according to the first indication information, the first data amount of the uplink CCCH SDU comprised in the third message of random access to be sent by the user equipment comprises:
    determining, according to the first indication information, a type of the first data amount of the uplink CCCH SDU comprised in the third message of random access; or
    determining, according to the first indication information, a third data amount of the uplink CCCH SDU and a MAC header comprised in the third message of random access.

16. An electronic device, comprising:
    a processor, and
    a memory for storing instructions executable by the processor,
    wherein the processor is configured to execute the resource allocating method according to claim 9.

17. An electronic device, comprising:
    a processor, and
    a memory for storing instructions executable by the processor,
    wherein the processor is configured to:
    send a first message of random access to a base station, wherein the first message of random access comprises first indication information, and the first indication information indicates a first data amount of an uplink common control channel service data unit (CCCH SDU) comprised in a third message of random access to be sent;
    receive a second message of random access from the base station; and
    send the third message of random access via uplink resources indicated by the second message of random access, wherein a data amount allowable to be transmitted via the uplink resources is greater than or equal to a second data amount of the third message of random access,
    wherein the first message of random access further comprises second indication information, and the second indication information indicates whether the third message of random access comprises the uplink CCCH SDU.

18. The electronic device according to claim 17, wherein the processor is further configured to:
    before sending the first message of random access to the base station, determine data amount ranges according to a plurality of preset data amounts;
    determine whether the second data amount of the third message of random access is equal to any one of the plurality of preset data amounts;
    in response to that the second data amount of the third message of random access is not equal to any one of the plurality of preset data amounts, determining a data amount range in which the second data amount of the third message of random access is located; and
    taking an upper limit value of the determined data amount range as the second data amount of the third message of random access.

* * * * *